United States Patent

[11] 3,563,151

| [72] | Inventor | Henry J. Koeber<br>Deerfield, Ill. |
|---|---|---|
| [21] | Appl. No. | 780,093 |
| [22] | Filed | Nov. 29, 1968 |
| [45] | Patented | Feb. 16, 1971 |
| [73] | Assignee | Bell & Howell Company<br>Chicago, Ill.<br>a corporation of Illinois |

[54] CAMERA FOCUSING MECHANISM WITH SEPARATED CAM AND PENDULOUS MEMBER
8 Claims, 7 Drawing Figs.

[52] U.S. Cl. ................................................. 95/45, 95/44; 352/140
[51] Int. Cl. .................................................. G03b 3/00
[50] Field of Search ........................................ 95/45, 44; 352/140, 139

[56] References Cited
UNITED STATES PATENTS
1,258,459  3/1918  Read ........................... 95/44

*Primary Examiner*—John M. Horan
*Assistant Examiner*—Richard L. Moses
*Attorney*—William F. Pinsak and John E. Peele, Jr.

ABSTRACT: A focusing mechanism for adjusting the lens of a camera according to camera-to-subject distance determined by angular orientation of a pendulous member. The lens is adjusted by a cam which is separate from but oriented in response to the position of the pendulous member. A control is manually operable to adjust the lens independently of orientation of the pendulous member.

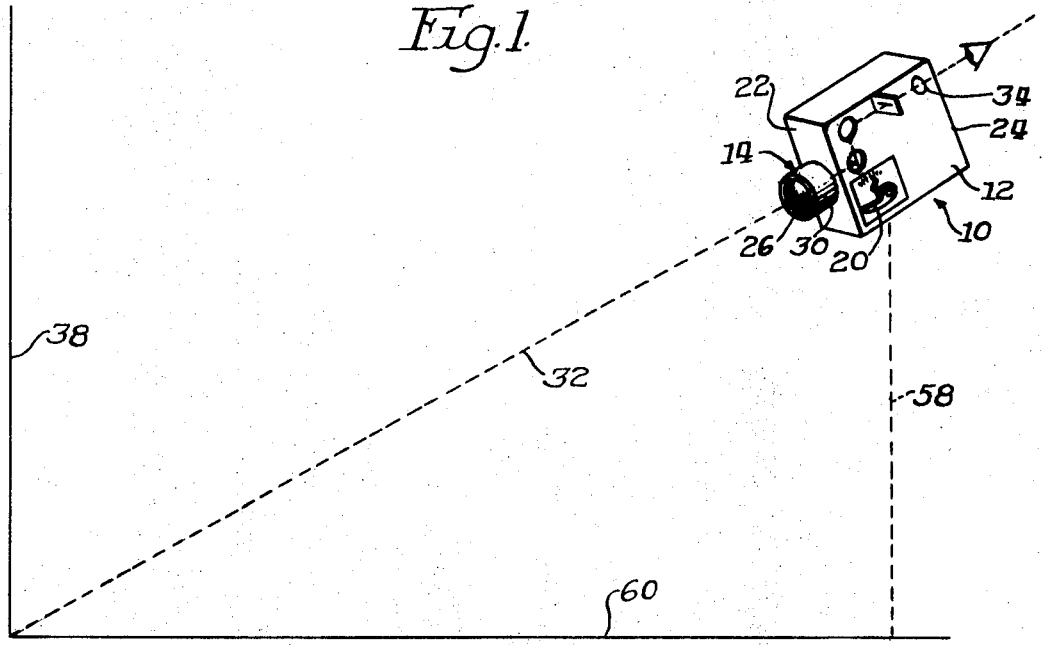
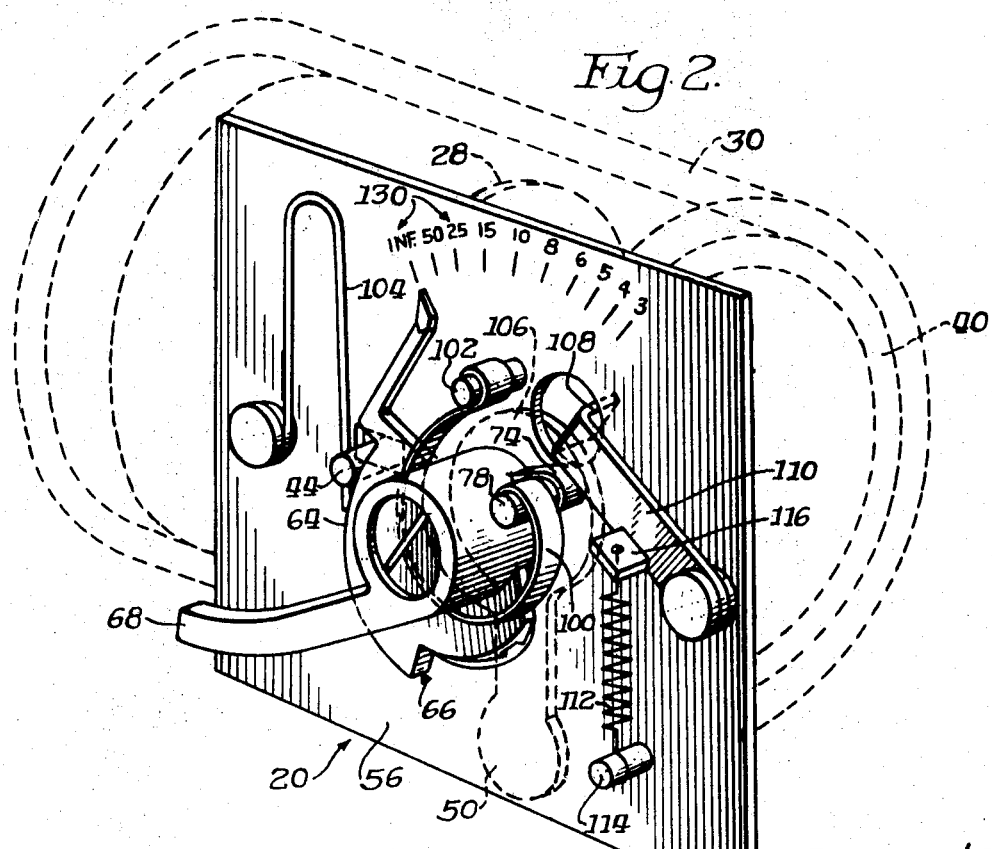

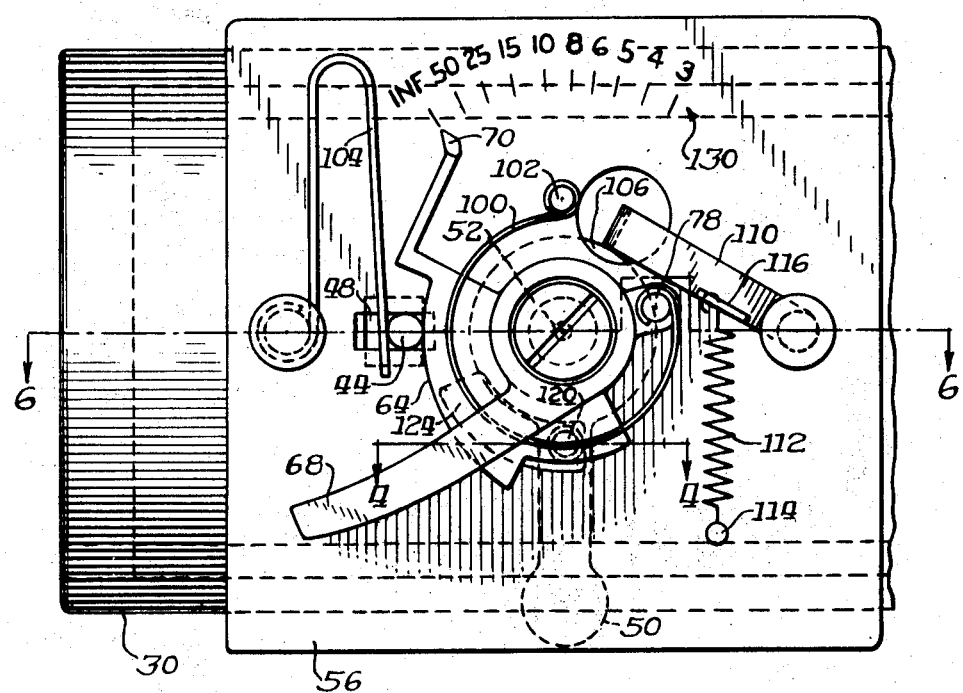
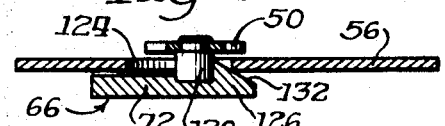
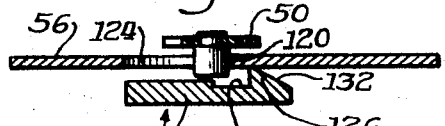
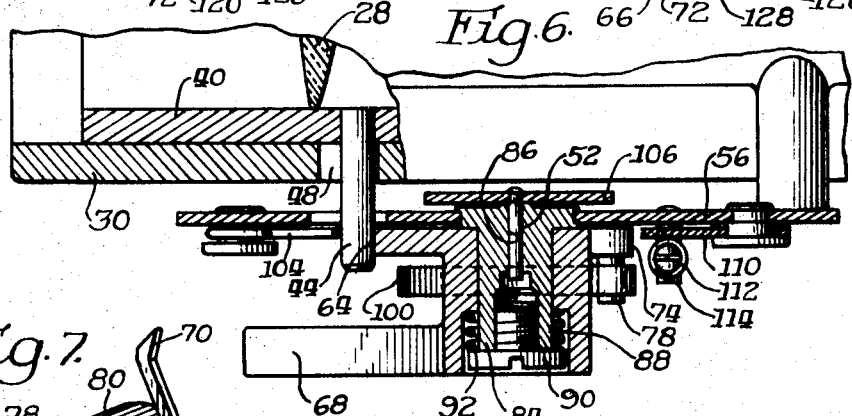
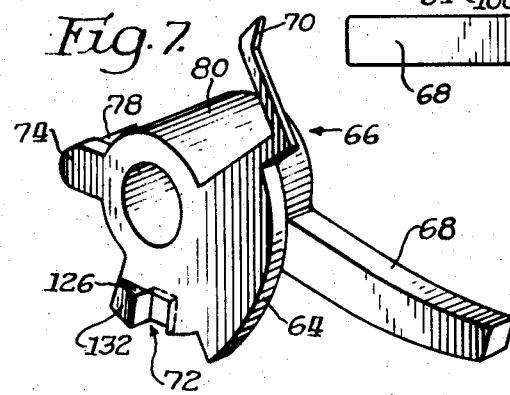
Inventor
Henry J. Koeber

CAMERA FOCUSING MECHANISM WITH SEPARATED CAM AND PENDULOUS MEMBER

The present invention relates to a focusing mechanism for the objective lens of an optical instrument, which lens is adjustable according to focal distances from a subject to the instrument. Particularly, this invention relates to a mechanism operable on the principle of triangulation for determining distance in response to orientation of a pendulous member relative to an optical axis defined by the objective lens when that axis is directed toward the base of the subject.

Triangulation is a procedure predicated on the concept that from a picture-taking or scene-focusing station at some level above the base of a subject, the distance to the subject (focal distance) is a function of the angle to the base of the subject. The principle is readily appreciated by imagining a right triangle wherein from a camera held at eye level, a vertical line extends to a point directly below the camera. A base line of the triangle extends between the point below the camera and the base of the subject. This line should be effectively horizontal. A hypotenuse or angled line of the triangle extends between the junction of the vertical line with an optical axis defined by the camera's objective and a vertical line through the subject at the intersection of that line and the base line. By the triangulation principle, the angle at the camera between the hypotenuse and the vertical line varies according to the distance from the vertical line to the junction of the base line and the hypotenuse. Thus, the varying angular relation may be used to determine the length of the base line. This information may then be converted mechanically into focal distance for adjustment of the objective lens for that distance.

A rangefinder device using this principle of triangulation may have a mechanical converter comprising a pendulous member, the relative angular condition of which with respect to the optical axis of the camera corresponds to the focal distance. Such a relative angular condition is achieved by rotating the camera at a scene focusing station to a condition at which the base of the subject can be aligned with a reference mark visible through sighting means associated with the camera. For each focal distance the objective lens of the camera has an optimum adjustment to cause its focal plane to coincide with the image plane of the camera in an "in-focus" condition. Thus, the optimum positioning of the objective lens may be determined by cooperation between the objective lens and the pendulous member defining the angle to which the camera is conditioned for scene focusing.

The main subject in a large percentage of scenes photographed by user of photographic equipment is a person or persons. Of the remaining subjects, most are relatively fixed during the time required to compose a picture and expose the film. Further, the vast majority of users of cine equipment are adults between five and six feet in height. Thus, since an eye-level type camera would be supported by a standing adult at a relatively constant distance above a given supporting surface, and most subjects stand on the same surface, constants are provided by which a simple and economic mechanical triangulation mechanism can be designed for focusing a camera objective used by this average user.

A mechanism using the principle of triangulation for setting the focus of an objective lens in accordance with each angular position of a pendulous member of a rangefinder is disclosed in a copending U.S. application, Ser. No. 735,231 filed June 7, 1968, titled "Camera Focusing Mechanism Using Triangulation Principle," and of common assignment. In that mechanism, a cam surface is formed on the pendulous member to translate angular orientation to distance. This mechanism is satisfactory for its intended function. However, certain difficulties have been encountered in assembly of these devices which have added to their cost. Also due to the construction, manual objective lens adjustment is such that its operation must be coupled to the semiautomatic adjustment. While these deficiencies are not detrimental to the operation of the device, to overcome these shortcomings of the mechanism, improvements have been made such that a mechanism is now provided with separate pendulous and cam members, and with a capacity for semiautomatic or manual rangefinding functions.

Thus, an object of the present invention is to provide a novel mechanism operable on the principle of triangulation for focusing an objective of a camera on a subject.

Another object is to provide a focusing mechanism having separate pendulous and cam members cooperating for adjustment of a camera objective lens.

A further object is to provide a focusing mechanism having a pendulous member which is restrainable frictionally in an adjusted position and a separate lens adjusting means orientable in response to the pendulous member.

A still further object is to provide a semiautomatic focusing mechanism having a manual control capacity for adjusting the focal distance of an objective lens from a position to which the lens was previously focused semiautomatically.

The features in an objective focusing mechanism for effecting the foregoing objects comprise an objective lens assembly including a lens element which is adjustable to a focal distance for focusing in an image plane of the camera the image of a subject at that corresponding focal distance. A pendulous member is mounted in the camera for relative movement to an angular position corresponding to the angular disposition of the optical axis of the lens with respect to the subject when that axis is aimed at the base of the subject. Also provided is a sighting means for viewing a subject for setting the optical axis at an angle corresponding to focal distance. A cam plate is provided which is adjustable by the pendulous member to a position in which it is locked until released. Further, the mechanism permits focusing of the objective by manual operation.

Further and other objects will be apparent from the description of the accompanying drawings in which like numerals refer to like parts.

In the drawings:

FIG. 1 is a schematic perspective view of the principle of triangulation with a camera in distance determining orientation;

FIG. 2 is a perspective view of a distance determining mechanism according to this invention and an objective assembly of a camera;

FIG. 3 is a side elevational view of the distance determining mechanism;

FIG. 4 is a plan view in section of a cam plate locking device of the mechanism, engaged, and taken along line 4–4 of FIG. 3;

FIG. 5 is a view similar to FIG. 4 with the cam plate locking device disengaged;

FIG. 6 is a sectional plan view of the mechanism taken along lines 6–6 of FIG. 3; and FIG. 7 is a perspective view of a control device by which the mechanism is enabled to be operated for semiautomatic or manual function.

Referring now to FIG. 1, there is shown an optical instrument, such as camera 10, having housing 12 supporting objective lens assembly 14 and distance determining and objective focusing mechanism 20. Housing 12, as oriented in the drawing, includes front wall portion 22 in which the objective assembly is supported and sidewall portion 24 on which focusing assembly 20 is supported. The objective assembly comprises focusable objective lens 26 including focusing lens element 28 supported in lens barrel 30. The assembly defines an optical axis 32 fixed relative to the housing.

In the rear wall of the housing (not shown) is viewing port or opening 34 through which a remote subject, shown as line 38, can be viewed either through objective assembly 14 or another opening (not shown) in housing front wall 22. Focusing lens element 28 is aligned and supported in sleeve 40 adjustable axially along optical axle 32 within barrel 30. In this preferred embodiment, sleeve 40 is slidably carried in barrel 30 and has a positioning stud 44 extending outwardly thereof and through slot 48 in the barrel. Although other limiting stops may be provided to define the extent of axial movement of sleeve 40, slot 48 is understood to function also for this purpose. Hence, sleeve 40 and focusing lens element 28 are adjustable along optical axis 32 wherein the focal plane defined by objective 26 can be made to coincide with an image or film plane (not shown) in camera 10.

In this preferred embodiment, an image viewed through port 34 and formed by the viewing system is received by objective lens 26 and reflected by a mirrors to a viewing screen having a reference mark thereon. When viewing a scene for focusing, the user aligns the base of subject 38 on the reference mark. This action orients housing 12 for subsequent adjustment of focusing mechanism 20 for the focal distance between the camera and the subject, After focusing objective lens 26, the camera may be used normally, and the reference mark may be ignored.

Focusing mechanism 20 cooperates with objective assembly 14 to cause semiautomatic adjustment of the focus of lens 26. The mechanism includes a pendulous member 50 mounted for free swinging movement about an axle shaft 52, as seen in FIGS. 3 and 6. Axle shaft 52 is supported in mechanism plate 56, which attaches mechanism 20 to the sidewall of camera housing 12. Although the movement of the pendulous member may be restricted, that member will seek a gravity oriented position when in free swinging condition. This position may thus be correlated relative to the optical axis of objective lens 26 when the axis is inclined as an angled or hypotenuse line of a right triangle such as is shown in FIG. 1.

Vertical line 58 of the right triangle is understood to extend vertically below the position of the camera to a point at which it intersects base line 60 extending substantially horizontally from the base of a subject. Vertical line 58 is understood to form one substantially constant value necessary to compute other values of the right triangle. To provide the other required unknown for computing such a triangle, an angle other than the right angle should be determined. Such an angle is determinable by orientation of the pendulous member relative to the optical axis.

By empirical computation, the angle defined by the pendulous member when the optical axis is aimed at the base of subject 38 can be related to focal distance. That is, focal distance is the length of base line 60 and varies according to the angle of hypotenuse or optical axis 32 relative to vertical line 58. An empirically computed cam surface 64 is provided in focusing mechanism 20 to translate the angle of pendulous member 50 into axial displacement of focusing lens element 28.

Cam surface 64 is formed as part of a cam plate molded integrally with control member 66 as shown in FIG. 7. The control member comprises mechanism control lever 68, position pointer or indicator 70, orientation pin receiver portion 72 of a coupling device, pusher lug 74, and post 78 extending from lug 74. Hub portion 80 defines the body portion of the control member and supports the member for rotation coaxially about axle shaft 52. Shaft 52 and hub portion 80 are mounted on mechanism plate 56 by bearing 84 having internal bore 86 in which axle shaft 52 is carried, and outer surface 88 about which hub portion 80 is rotatable.

Control member 66 is retained about bearing 84 by a retaining member shown as headed screw 90, yet is permitted slight movement axially of bearing 84 by coiled spring 92 arranged to urge the control member inwardly of housing 12. That is, control member 66 is spring biased inwardly about bearing 84 in an axial manner and is movable axially a limited amount against the biasing of coiled spring 92.

Control member 66 is rotatable about bearing 84 by manual actuation of control lever portion 68 initially in a counterclockwise direction as oriented in FIGS. 2 and 3. Depression of control lever portion 68 rotates the whole member against the counter urging of leaf spring 100. The spring is connected at one end to post 78 of the control member and at its other end to post 102 which is fixed to mechanism plate 56. As the control member is rotated to its maximum extent in the counterclockwise direction, cam surface 64 rotates to a minimum displacement relative to lens positioning stud 44. This stud is held against the cam surface by U-shaped spring 104 supported on mechanism plate 56.

When control lever 68 is released, leaf spring 100 drives the control member in a clockwise direction to a position defined by the orientation of pendulous member 50 in a manner as hereinafter described.

Pendulous member 50 is provided with a disc portion 106 concentric with receiving hole for axle shaft 52. As seen in FIG. 2, cooperating with disc portion 106 is brake lever member 110 mounted on mechanism plate 56 for movement of an end portion 108 of that member into frictional engagement with the disc portion. Torsion spring 112, connected to post 114 on the mechanism plate and lug 116 of brake lever member 110, pulls end portion 108 of brake member 110 against disc portion 106 when the brake member is not restrained from such engagement. Brake lever member 110 is disengaged from disc portion 106 by pusher or lifter lug 74 on control member 66. Disengagement of the disc portion and the brake member frees pendulous member 50 for movement only when control lever 68 is pushed to its maximum extent, wherein lug 74 engages and raises brake member 110 against the urging of spring 112.

Coupling or orientation pin 120 is mounted in the depending portion of pendulous member 50 for movement angularly about axle shaft 52 as the pendulous member swings, as seen in FIG. 3. Pin 120 passes through arcuate slot 124 in mechanism plate 56 for selective engagement and cooperation with orientation pin receiver portion 72 of control member 66, as seen in FIGS. 4 and 5.

Upon rotation of control lever 68 in a counterclockwise direction from the orientation as in FIG. 3, brake lever 110 frees pendulous member 50 for free swinging movement. While lever 68 is depressed, camera optical axis 32 should be aimed at the base of subject 38. This inclination of optical axis 32 causes relative rotation of pendulous member 50 and pin 120 to a new gravity oriented position. It will be appreciated that lever 68 is now ready to be released, and upon release will clear lifter lug 78 from its restraining position relative to brake lever 110, wherein spring 112 will cause brake lever 110 to hold pendulous member 50 in an adjusted condition.

Releasing of control lever 68 permits leaf spring 100 to rotate control member 66 clockwise until finger 126 on coupling member 72 engages pin 120 of pendulous member 50. Leaf spring 100 is designed to be relatively weaker than the frictional engagement of brake lever 110 against pendulous member 50 in order that it may be held against movement. As finger 126 engages pin 120, control member 66 is stopped in a rotated position and spring 92 urges pin 120 into recess 128 adjacent finger 126. As control member 66 is stopped, position indicator or pointer 70 thereon is aligned with indicia forming distance scale 130. Scale 130 is visible to the user of the instrument to permit reading of the distance determined by the mechanism.

Focusing lens element 28, by the urging of spring 104 against positioning stud 44, is shifted axially into engagement with cam surface 64. This influencing spring urges pin 44 continuously toward one end of its adjustment range, that end being restricted primarily by cam surface 64. As so adjusted, cam surface 64 blocks pin 44 and prevents additional displacement, thereby positioning focusing element 28 for a focal distance corresponding to the adjustment of mechanism 20. Thus, for semiautomatic adjustment of the focus of objective 26 to a new focal distance, the user need only depress control lever 68 and aim at the base of subject 38.

Depression of control lever 68 for reorientation of pendulous member 50 releases brake lever 110. Rotation of control lever 68 also causes ramp portion 132 of finger 126 of the coupling member to ride against the edge of cutout 124 in mechanism plate 66. As the ramp pushes control member 66 against spring 92, the member moves axially outwardly of bearing 84 so as to clear pin 120 of recess 128 in control member 66. Finger 126 then rides against the mechanism plate until it again moves into recess 124 upon rotation of control member 66 by leaf spring 100.

Manual adjustment of the focus of objective 26 is enabled by moving lever 68 from a position to which it had been adjusted previously with pointer 70 aligned with first focal distance indicia on scale 130 to a new position aligned with different indicia. The last semiautomatic or manual positioning of control member 66 has left pin 120 engaged in recess 128. Rotation of lever 68 positively adjusts the cam surface 64 for repositioning of lens element 28 to the desired focal distance in response to rotation of the lever in either direction. Thus, continuous adjustment of the control member through the focusing range of the objective is enabled.

I claim:

1. A distance determining mechanism for an optical instrument having a housing and a focusable objective lens arranged on said housing for focusing adjustment, the mechanism comprising:
   a pendulous member mounted for swinging movement relative to said housing to an angular aspect corresponding to focal distance;
   an orientation pin carried and positioned by said pendulous member;
   cam means supported in said housing and rotatable relative to said pendulous member;
   orientation pin receiver means cooperating with said cam means for adjustably positioning said cam means responsive to the position of said orientation pin; and
   means adjusting said focusable objective lens to a focal distance responsive to the adjusted position of said cam means.

2. A mechanism as claimed in claim 1 wherein: the objective lens defines an optical axis relative to which said pendulous member is swingable under the influence of gravity upon inclination of said axis below a horizontal condition; the mechanism comprising a brake member for selectively engaging said pendulous member in an adjusted position.

3. A mechanism as claimed in claim 1 comprising: a brake member supported in said housing for selective engagement with said pendulous member.

4. A mechanism as claimed in claim 3 comprising: a brake release member operable selectively to remove said brake member for engagement with said pendulous member.

5. A mechanism as claimed in claim 4 comprising: a control member displaceable manually to a first position and supporting said brake release member for disengagement of said brake lever and said pendulous member when said control member is in said first position.

6. A mechanism as claimed in claim 1 comprising:
   a control member displaceable manually to a first position;
   spring means for moving said control member from said first position to any of a plurality of second positions; and
   said orientation pin receiver means being associated with said control means for defining said second position.

7. A mechanism as claimed in claim 1 comprising:
   a control member displaceable manually to a first position;
   spring means for moving said control member to any of a plurality of second positions from said first position;
   a brake member to engage releasably said pendulous member; and
   brake release means on said control member operable when said control member is displaced to said first position to release said brake means, said release means being inactive when said control member is urged to a second position wherein said brake member engages said pendulous member.

8. A distance determining mechanism for an optical instrument having a housing and a focusable object lens arranged on said housing for focusing adjustment, comprising:
   a pendulous member mounted for swinging movement relative to said housing to an angular aspect corresponding to focal distance;
   an orientation pin carried and positioned by said pendulous member;
   control means supported by said housing for movement and couplable with said orientation pin for orientation in response to the adjusted position of said orientation pin;
   a lens adjusting surface on said control means for adjusting said objective lens to focal distance in response to orientation of said control means; and
   manually engageable means on said control means for enabling manual adjustment of said lens adjusting surface of said control means independently of said pendulous member.